(12) United States Patent
Harp et al.

(10) Patent No.: US 10,109,381 B2
(45) Date of Patent: Oct. 23, 2018

(54) METHODS OF FORMING TRIURANIUM DISILICIDE STRUCTURES, AND RELATED FUEL RODS FOR LIGHT WATER REACTORS

(71) Applicant: BATTELLE ENERGY ALLIANCE, LLC., Idaho Falls, ID (US)

(72) Inventors: Jason Michael Harp, Idaho Falls, ID (US); Paul Alan Lessing, Idaho Falls, ID (US); Rita Elaine Hoggan, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 503 days.

(21) Appl. No.: 14/746,279

(22) Filed: Jun. 22, 2015

(65) Prior Publication Data
US 2016/0372221 A1 Dec. 22, 2016

(51) Int. Cl.
| | | |
|---|---|---|
| *G21C 21/02* | (2006.01) | |
| *G21C 3/04* | (2006.01) | |
| *C04B 35/515* | (2006.01) | |
| *C04B 35/58* | (2006.01) | |
| *C04B 35/626* | (2006.01) | |
(Continued)

(52) U.S. Cl.
CPC .......... *G21C 21/02* (2013.01); *C04B 35/5158* (2013.01); *C04B 35/58085* (2013.01); *C04B 35/6261* (2013.01); *C04B 35/634* (2013.01); *C04B 35/65* (2013.01); *C04B 35/653* (2013.01); *G21C 3/58* (2013.01); *C04B 2235/3891* (2013.01); *C04B 2235/5436* (2013.01); *C04B 2235/5445* (2013.01); *C04B 2235/6562* (2013.01); *C04B 2235/6567* (2013.01);
(Continued)

(58) Field of Classification Search
CPC .......... C04B 35/5158; C04B 35/58085; C04B 35/6261; C04B 35/634; C04B 35/65; C04B 35/653; G21C 21/02; G21C 3/58
See application file for complete search history.

(56) References Cited

U.S. PATENT DOCUMENTS

| | | |
|---|---|---|
| 3,100,183 A | 8/1963 | Anderson |
| 5,762,838 A | 6/1998 | Ohmuta et al. |
(Continued)

OTHER PUBLICATIONS

Harp et al., "Uranium silicide pellet fabrication by powder metallurgy for accident tolerant fuel evaluation and irradiation", Journal of Nuclear Materials, vol. 466 (Jun. 21, 2015), pp. 728-738.
(Continued)

*Primary Examiner* — Mathieu D Vargot
(74) *Attorney, Agent, or Firm* — TraskBritt

(57) ABSTRACT

A method of forming a triuranium disilicide structure comprises forming a mixture comprising uranium particles and silicon particles. The mixture is pressed to form a compact comprising the uranium particles and the silicon particles. The compact is subjected to an arc melting process to form a preliminary triuranium disilicide structure. The preliminary triuranium disilicide structure is subjected to a comminution process to form a fine triuranium disilicide powder. The fine triuranium disilicide powder is pressed to form a green triuranium disilicide structure. The green triuranium disilicide structure is then sintered. Additional methods of forming a triuranium disilicide structure are also described, as are fuel rods for light water reactors.

24 Claims, 9 Drawing Sheets

(51) Int. Cl.
  *C04B 35/634*  (2006.01)
  *C04B 35/65*   (2006.01)
  *C04B 35/653*  (2006.01)
  *G21C 3/58*    (2006.01)

(52) U.S. Cl.
  CPC .. *C04B 2235/6581* (2013.01); *C04B 2235/77* (2013.01); *G21C 3/04* (2013.01); *Y02E 30/38* (2013.01)

(56) References Cited

U.S. PATENT DOCUMENTS

| | | |
|---|---|---|
| 8,293,151 B2    | 10/2012 | Lahoda et al. |
| 2007/0064861 A1 | 3/2007  | Sterbentz |
| 2007/0133733 A1 | 6/2007  | Popa-Simil |
| 2011/0176650 A1 | 7/2011  | Doerr et al. |
| 2011/0206174 A1 | 8/2011  | Hallstadius et al. |
| 2011/0286570 A1 | 11/2011 | Farmer et al. |
| 2012/0002777 A1 | 1/2012  | Lahoda et al. |
| 2012/0002778 A1 | 1/2012  | Lahoda et al. |
| 2012/0087457 A1 | 4/2012  | Garnier et al. |
| 2012/0257707 A1 | 10/2012 | Ahlfeld et al. |
| 2012/0314831 A1 | 12/2012 | Terrani et al. |
| 2013/0322590 A1 | 12/2013 | Venneri et al. |

OTHER PUBLICATIONS

International Search Report for International Patent Application No. PCT/US/2016/028669, dated Jul. 27, 2016, 2 pages.
International Written Opinion for International Patent Application No. PCT/US/2016/028669, dated Jul. 27, 2016, 5 pages.
Sinha et al., "Development of powder metallurgy technique for synthesis of U3Si2 dispersoid", Journal of Nuclear Materials, vol. 383, Issues 1-2 (Dec. 15, 2008), pp. 196-200.

METHODS OF FORMING TRIURANIUM DISILICIDE STRUCTURES, AND RELATED FUEL RODS FOR LIGHT WATER REACTORS

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

FIELD

Embodiments of the disclosure relate generally to methods of forming fissile material structures for light water reactors (LWRs), and to related fissile material structures, fuel rods, and fuel assemblies. More particularly, embodiments of the disclosure relate to methods of forming $U_3Si_2$ structures, and to related $U_3Si_2$ structures, fuel rods, and fuel assemblies.

BACKGROUND

Light water reactors (LWRs), including pressurized water reactors (PWRs) and boiling water reactors (BWRs), are thermal-neutron reactors than utilize water as both a coolant and a neutron moderator. An LWR generally includes a reactor core exhibiting fuel assemblies formed of and including fuel rods each comprising a cladding tube and fissile material structures (e.g., pellets, annular structures, particles, etc.) contained within the cladding tube. The fissile material structures typically comprise uranium dioxide ($UO_2$) structures (e.g., $UO_2$ pellets). The fuel rods are positioned relative to one another to provide neutron flux in the reactor core and produce thermal energy through controlled nuclear fission. Water is flowed through the reactor core to extract a portion of the produced thermal energy, which can then be utilized for the production of work.

Recently, triuranium disilicide ($U_3Si_2$) structures have been investigated as viable alternatives to the $UO_2$ structures typically employed in LWR fuel rods. $U_3Si_2$ exhibits a number of favorable properties as compared to $UO_2$. For example, there are approximately 17% more uranium atoms in a set volume of $U_3Si_2$ than there are in the same volume of $UO_2$, given a constant percentage of theoretical density (e.g., 12.2 g/cm³ for $U_3Si_2$, and 10.96 g/cm³ for $UO_2$) for both materials. Such high uranium loading has the potential to increase power ratings, extend fuel cycle length, and/or reduce enrichment requirements, all of which are economically beneficial. The higher uranium loading may also allow for the practical application of advanced cladding materials that carry a neutronic penalty compared to conventional cladding materials (e.g., Zircaloy materials). The higher thermal conductivity of $U_3Si_2$ as compared to $UO_2$ can also reduce the anticipated centerline temperature in an $U_3Si_2$-fueled fuel rod as compared to an $UO_2$-fueled fuel rod, which can have positive impacts on fuel rod performance in a variety of LWR accident conditions.

Accordingly, there is a continuing need for methods of forming $U_3Si_2$ structures suitable for use in LWRs, as well as for fuel rods including the $U_3Si_2$ structures and for fuel assemblies including the fuel rods. In addition, it would be desirable if such methods facilitated the formation of $U_3Si_2$ structures exhibiting relatively high densities, such as densities greater than or equal to about 11.47 g/cm³ (e.g., about 94.0 percent of the theoretical density of $U_3Si_2$).

BRIEF SUMMARY

In accordance with one embodiment described herein, a method of forming an $U_3Si_2$ structure comprises forming a mixture comprising uranium particles and silicon particles. The mixture is pressed to form a compact comprising the uranium particles and the silicon particles. The compact is subjected to an arc melting process to form a preliminary $U_3Si_2$ structure. The preliminary $U_3Si_2$ structure is subjected to a comminution process to form a fine $U_3Si_2$ powder. The fine $U_3Si_2$ powder is pressed to form a green $U_3Si_2$ structure, and the green $U_3Si_2$ structure is sintered.

In additional embodiments, a method of forming an $U_3Si_2$ structure comprises forming a compact comprising from about 92.5 wt % to about 92.7 wt % uranium particles each independently exhibiting a particle size less than or equal to about 300 μm and about 7.3 wt % to about 7.5 wt % silicon particles each independently exhibiting a particle size less than or equal to about 150 μm. The compact is subjected to an arc melting process to form a preliminary $U_3Si_2$ structure. The preliminary $U_3Si_2$ structure is subjected to a hammer milling process to form an initial $U_3Si_2$ powder comprising $U_3Si_2$ particles each independently having a particle size less than or equal to about 5 mm. The initial $U_3Si_2$ powder is subjected to a planetary milling process to form a fine $U_3Si_2$ powder comprising fine $U_3Si_2$ particles exhibiting an average particle size less than or equal to about 4 μm. The fine $U_3Si_2$ particles are combined with at least one binder material to form a substantially homogeneous mixture. The substantially homogeneous mixture is pressed at a pressure within a range of from about 124 MPa to about 156 MPa form a green $U_3Si_2$ structure exhibiting an aspect ratio less than or equal to about 1.0. The green $U_3Si_2$ structure is sintered at a temperature within a range of from about 1200° C. to about 1550° C. under at least one of vacuum or an inert atmosphere to form a sintered $U_3Si_2$ structure. The sintered $U_3Si_2$ structure is subjected to machining process to reduce at least one of a diameter of the sintered $U_3Si_2$ structure or a height of the sintered $U_3Si_2$ structure.

In further embodiments, a fuel rod for a light water reactor comprises an elongate cladding tube and $U_3Si_2$ structures stacked within the elongate cladding tube, each of the $U_3Si_2$ structures independently exhibiting a density greater than or equal to about 94 percent of a theoretical density of $U_3Si_2$ and formed by a method comprising forming a mixture comprising uranium particles and silicon particles, pressing the mixture to form a compact comprising the uranium particles and the silicon particles, subjecting the compact to an arc melting process to form a preliminary $U_3Si_2$ structure, pressing the fine $U_3Si_2$ powder to form a green $U_3Si_2$ structure, and sintering the green $U_3Si_2$ structure.

DETAILED DESCRIPTION

Figure 1:
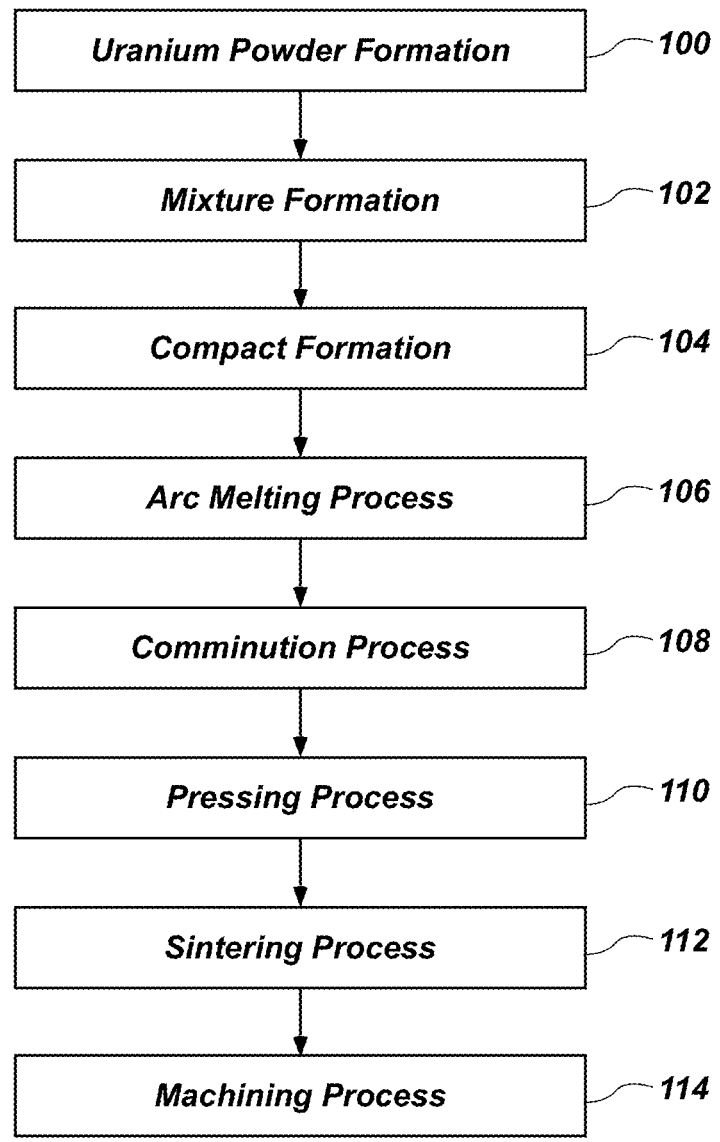
FIG. 1 is a simplified flow diagram of a method of forming an $U_3Si_2$ structure for use in an LWR, in accordance with embodiments of the disclosure.

Methods of forming $U_3Si_2$ structures are described, as are $U_3Si_2$ structures, LWR fuel rods including such $U_3Si_2$ structures, and LWR fuel assemblies including such fuel rods. In some embodiments, a method of forming an $U_3Si_2$ structure includes cleaning and dividing a relatively larger uranium structure into smaller uranium structures. One or more of the uranium structures may be subjected to a hydriding/dehydriding process to form a uranium powder. The uranium powder may be combined with a silicon powder at stoichiometric or near stoichiometric amounts for the formation of $U_3Si_2$ to form a mixture. The mixture may be shaped and pressed to form a compact, and then the compact may be subjected to an arc melting process to form a preliminary $U_3Si_2$ structure. The preliminary $U_3Si_2$ structure may be subjected to a comminution process to pulverize the preliminary $U_3Si_2$ structure and form an $U_3Si_2$ powder exhibiting a desired particle size distribution and a desired average particle size. The $U_3Si_2$ powder may then be pressed to form a green (e.g., unsintered) $U_3Si_2$ structure exhibiting a desired green density, and the green $U_3Si_2$ structure may be sintered to form a sintered $U_3Si_2$ structure exhibiting desired properties (e.g., a desired high density, such as a density greater than or equal to about 94 percent of the theoretical density of $U_3Si_2$). One or more additives (e.g., milling aid(s), binder material(s), etc.) may, optionally, be utilized during the process to promote and/or facilitate one or more of the desired properties (e.g., the desired density) of the sintered $U_3Si_2$ structure. The sintered $U_3Si_2$ structure may be subjected to one or more machining processes to modify the shape and/or the size of the sintered $U_3Si_2$ structure as desired for a particular application (e.g., an LWR application). The methods and structures of the disclosure may increase the efficiency of LWRs, increase the safety of LWRs, and reduce costs associated with LWR applications as compared to corresponding conventional methods and structures.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow for manufacturing a structure, apparatus, or assembly. The structures described below do not form a complete apparatus or a complete assembly. Only those process acts and structures necessary to understand the embodiments of the disclosure are described in detail below. Additional acts to form the complete apparatus or the complete assembly from various structures may be performed by conventional fabrication techniques. Also note, any drawings accompanying the present application are for illustrative purposes only, and are thus not drawn to scale. Additionally, elements common between figures may retain the same numerical designation.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped, etc.) and the spatially relative descriptors used herein interpreted accordingly.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

As used herein, the term "configured" refers to a size, shape, material composition, and arrangement of one or more of at least one structure and at least one apparatus facilitating operation of one or more of the structure and the apparatus in a pre-determined way.

FIG. 1 is a simplified flow diagram illustrating a method of forming at least one $U_3Si_2$ structure, such as an $U_3Si_2$ structure (e.g., an $U_3Si_2$ pellet) for use in an LWR, in accordance with embodiments of the disclosure. The method may include a uranium powder formation process 100 that includes forming a uranium powder formed of and including uranium particles; a mixture formation process 102 that includes combining the uranium powder with a silicon powder formed of and including silicon particles; a compact formation process 104 that includes forming the mixture into at least one compact; an arc melting process 106 that includes forming at least one preliminary $U_3Si_2$ structure from the compact; a comminution process 108 that includes pulverizing the preliminary $U_3Si_2$ structure into a fine $U_3Si_2$ powder exhibiting a desired particle size distribution and a desired average particle size; a pressing process 110 that includes forming the fine $U_3Si_2$ powder into a green $U_3Si_2$ structure; a sintering process 112 that includes forming the green $U_3Si_2$ structure into a sintered $U_3Si_2$ structure; and a machining process 114 that includes further processing the sintered $U_3Si_2$ structure to form a machined $U_3Si_2$ structure exhibiting a desired shape and dimensions. With the description as provided below, it will be readily apparent to one of ordinary skill in the art that the method described herein may be used in various applications. In other words, the method may be used whenever it is desired to form an $U_3Si_2$ structure.

The uranium powder formation process 100 includes cleaning and dividing (e.g., segmenting) at least one relatively larger uranium structure (e.g., a bulk uranium structure) into smaller uranium structures, and then subjecting the smaller uranium structures to at least one hydriding/dehydriding process to form a uranium powder. The relatively larger uranium structure may be a unitary structure (e.g., a unitary cylinder, a unitary rod, etc.) formed of and including at least one uranium isotope, such as at least one of uranium-235, uranium-238, uranium-236, uranium-234, uranium-233, and uranium-232. In some embodiments, the bulk uranium structure is formed of and includes at least one of uranium-235 and uranium-238. The bulk uranium structure may be formed through conventional processes, which are not described in detail herein.

The relatively larger uranium structure may be cleaned using at least one cleaning agent formulated to substantially remove oxides and/or other contaminates (e.g., organic materials) from surfaces of the relatively larger uranium structure. As a non-limiting example, the relatively larger uranium structure may be exposed to a nitric acid ($HNO_3$) solution to remove oxides from one or more surfaces thereof. The $HNO_3$ solution may, for example, comprise an aqueous $HNO_3$ solution formed of and including less than or equal to about 20 weight percent (wt %) $HNO_3$, such as less than or equal to about 10 wt % $HNO_3$. As another non-limiting example, the bulk uranium structure may be exposed to at least one organic solvent (e.g., trichloroethylene, perchloroethylene, ethanol, etc.) to remove organic material (e.g., oil) from one or more surfaces thereof. In some embodiments, the bulk uranium structure is exposed to an aqueous solution comprising 10 wt % $HNO_3$, followed by at least one rinse with one or more of water and ethanol. The relatively larger uranium structure may be treated with the cleaning agent using at least one conventional process (e.g., a conventional immersion process, a conventional soaking process, a conventional spraying process, a conventional spin-coating process, a conventional vapor-coating process, etc.) and conventional processing equipment, which are not described in detail herein.

The cleaned, relatively larger uranium structure may be divided into any desired number of smaller uranium structures. The smaller uranium structures may each independently exhibit any desired shape and any desired size. As a non-limiting example, the cleaned, relatively larger uranium structure may be segmented into smaller uranium structures (e.g., smaller uranium cylinders, smaller uranium rods, etc.) each independently having a weight within a range of from about 10 grams (g) to about 25 g. The cleaned, relatively larger uranium structure may be divided into the smaller uranium structures using conventional processes (e.g., shearing, cutting, etc.) and conventional processing equipment, which are not described in detail herein.

The hydriding/dehydriding process may include exposing the smaller uranium structures to a temperature within a range of from about 150° C. to about 300° C. (e.g., about 225° C.) in a hydrogen atmosphere to form uranium hydride ($UH_3$), and then exposing the $UH_3$ structures to a temperature within a range of from about 150° C. to about 300° C. (e.g., about 225° C.) under negative pressure (e.g., vacuum) to remove hydrogen from $UH_3$ structures and form the uranium powder. The hydriding/dehydriding process may utilize differences in the lattice parameters of $UH_3$ and uranium to break the smaller uranium structures down into the uranium powder. Any process duration(s) sufficient to convert the smaller uranium structures into a uranium powder may be utilized. By way of non-limiting example, the hydriding act and the dehydriding act of the hydriding/dehydriding process may each independently last from about 30 minutes to about 2 hours (e.g., about 1 hour). An additional hydriding/dehydriding process may, optionally, be utilized to break down remaining portions of the smaller uranium structures (if any), and/or to reduce the dimensions of uranium particles of the uranium powder. If performed, the additional hydriding/dehydriding process may utilize substantially the same parameters (e.g., substantially the same temperatures, substantially the same durations) as the hydriding/dehydriding process, or may utilize different parameters (e.g., different temperatures, different durations) than the hydriding/dehydriding process. In some embodiments, the smaller uranium structures and/or the uranium powder formed therefrom are subjected to the at least one hydriding/dehydriding process for a sufficient number of times to form a uranium powder comprising uranium particles each independently exhibiting a particle size (e.g., a particle diameter) less than or equal to about 300 micrometers (μm).

With continued reference to FIG. 1, the mixture formation process 102 includes mixing (e.g., combining and agitating) the uranium powder formed through the hydriding/dehydriding process within a silicon powder to form a mixture of the uranium powder and the silicon powder. The silicon powder may be formed of and include silicon particles having a desired average particle size. For example, the silicon powder may comprise silicon particles each independently exhibiting a particle size less than or equal to about 300 μm, such as less than or equal to about 150 μm, or within a range of from about 44 μm to about 149 μm. The silicon particles may be monodisperse, wherein each of the silicon particles exhibits substantially the same size and shape, or may be polydisperse, wherein the silicon particles include a range of sizes and/or shapes. The silicon powder may exhibit substantially the same particle size distribution and average particle size as the uranium powder, or may exhibit at least one of different a particle size distribution and a different average particle size than the uranium powder. The uranium powder and the silicon powder may be substantially homogeneously distributed within the mixture.

The relative amounts of uranium and silicon in the mixture of the uranium powder and the silicon powder may be tailored to achieve structures (e.g., ingots, particles, etc.) substantially formed of and including $U_3Si_2$ upon additional processing (e.g., arc melting), as described in further detail below. The uranium powder and the silicon powder may be combined in stoichiometric quantities or near stoichiometric quantities for the formation of $U_3Si_2$. In some embodiments, the uranium powder and the silicon powder are combined to achieve stoichiometric quantities of uranium and silicon (i.e., 92.7 wt % uranium and 7.3 wt % silicon) for the subsequent formation of $U_3Si_2$. In additional embodiments, the silicon powder is combined with the uranium powder in excess of amount of silicon stoichiometrically required for the subsequent formation of $U_3Si_2$. For example, the uranium powder and the silicon powder may be combined to achieve less than 92.7 wt % uranium and greater than 7.3 wt % silicon, such as about 92.6 wt % uranium and about 7.4 wt % silicon, or about 92.5 wt % uranium and about 7.5 wt % silicon. The excess silicon may account for silicon lost during subsequent processing, and/or may minimize the formation of other uranium silicides (e.g., triuranium silicide ($U_3Si$)) and/or uranium solid solution phases.

Next, the compact formation process 104 includes forming the mixture of the uranium powder and the silicon powder into at least one compact. The compact formation process 104 may include providing at least a portion of the mixture into a cavity of a container (e.g., canister, cup, etc.), and then applying pressure to the portion of the mixture within the cavity to form a compact exhibiting a desired geometric configuration (e.g., shape and size). In some embodiments, the cavity of the container (and, hence, the compact formed within the cavity) exhibits a substantially rectangular shape. In additional embodiments, the cavity of the container may exhibit a different shape, such as a cylindrical shape, a conical shape, a pyramidal shape, a cubic shape, a cuboidal shape, a spherical shape, a hemispherical shape, a semi-cylindrical shape, truncated versions thereof, or an irregular shape. Any suitable pressure may be employed to form the compact from the mixture of the uranium powder and the silicon powder, such as a pressure within a range of from about 150 megapascals (MPa) to about 300 MPa (e.g., about 225 MPa). Forming the compact from the mixture of the uranium powder and the silicon powder may place the uranium particles and the silicon particles in more intimate contact, facilitating enhanced $U_3Si_2$ formation during subsequent processing, as described in further detail below.

With continued reference to FIG. 1, the arc melting process 106 includes arc melting the compact to react the uranium and the silicon thereof and form a preliminary $U_3Si_2$ structure. The compact may be provided on, over, or into a conductive structure (e.g., a conductive container, such as a copper crucible), an electrode may be provided over the compact, and a relatively low electrical current (e.g., a direct current within a range of from about 75 amps to about 300 amps) may be applied to the electrode to create an arc between the electrode and the conductive structure to melt the compact and form a molten $U_3Si_2$ structure. The conductive structure may be cooled (e.g., by way of a water jacket) to control the solidification rate of the molten $U_3Si_2$ structure to the preliminary $U_3Si_2$ structure.

Optionally, prior to arc melting the compact to form the preliminary $U_3Si_2$ structure, the compact may be subjected to at least one annealing process to agglomerate the uranium particles and the silicon particles thereof. The annealing process may, for example, include exposing the compact to a temperature within a range of about 800° C. to about 1450° C. for a sufficient period of time to agglomerate the uranium particles and the silicon particles thereof. In some embodiments, the compact is exposed to a temperature of about 800° C. for about two (2) hours prior to performing the arc melting process 106. In additional embodiments, the compact is exposed to a temperature of about 1450° C. for about 30 minutes prior to performing the arc melting process 106. The annealing process, if performed, may reduce or even eliminate at least one of powder spray and silicon loss during the arc melting process 106.

Upon formation, the preliminary $U_3Si_2$ structure may be re-melted and re-solidified to increase the homogeneity thereof. For example, the preliminary $U_3Si_2$ structure may be flipped (e.g., inverted), arc re-melted, and re-solidified. The preliminary $U_3Si_2$ structure may be arc re-melted and re-solidified any number of times facilitating an increase in the homogeneity of the preliminary $U_3Si_2$ structure without substantially decreasing the purity of (e.g., increasing impurities within) the preliminary $U_3Si_2$ structure. By way of non-limiting example, the preliminary $U_3Si_2$ structure may be arc re-melted and re-solidified less than or equal to two times. In some embodiments, the preliminary $U_3Si_2$ structure is arc re-melted and re-solidified two times. The preliminary $U_3Si_2$ structure may be arc re-melted and re-solidified using substantially the same parameters (e.g., electric current, duration, etc.) as those employed to form the preliminary $U_3Si_2$ structure from the compact, or may be arc re-melted and re-solidified using at least one different parameter (e.g., a different electric current, a different duration) than that employed to form the preliminary $U_3Si_2$ structure from the compact. In some embodiments, the preliminary $U_3Si_2$ structure is arc re-melted using at least one higher electric current than the electric current employed to form the preliminary $U_3Si_2$ structure from the compact. For example, the preliminary $U_3Si_2$ structure may be formed using an electric current within a range of from about 75 Amps to about 150 Amps, and then may be arc re-melted using an electric current of greater than about 150 Amps (e.g., about 300 Amps). The relatively lower electric current used to form the preliminary $U_3Si_2$ structure from the compact may reduce or even eliminate at least one of powder spray and silicon loss during the formation of the preliminary $U_3Si_2$ structure.

Next, the comminution process 108 includes pulverizing (e.g., crushing, milling, grinding, breaking down, etc.) the preliminary $U_3Si_2$ structure into a fine $U_3Si_2$ powder formed of and including fine $U_3Si_2$ particles exhibiting a desired particle size distribution and a desired average particle size. The particle size distribution and the average particle size of the fine $U_3Si_2$ powder may be selected at least partially based on a desired density of a sintered $U_3Si_2$ structure to be subsequently formed from the fine $U_3Si_2$ powder, as described in further detail below. The comminution process 108 may, for example, include performing a series of pulverization processes (e.g., milling processes, grinding processes, crushing processes, etc.) to form progressively smaller $U_3Si_2$ particles beginning with the preliminary $U_3Si_2$ structure. For example, and as described in further detail below, the preliminary $U_3Si_2$ structure may be pulverized into initial $U_3Si_2$ particles exhibiting an initial particle size distribution and an initial average particle size using an initial milling process, the initial $U_3Si_2$ particles may be pulverized into smaller $U_3Si_2$ particles exhibiting a smaller particle size distribution and a smaller average particle size using an additional milling process, and so on, to achieve the fine $U_3Si_2$ powder exhibiting the desired particle size distribution and the desired average particle size.

The initial milling process may include pulverizing the preliminary $U_3Si_2$ structure, and then screening (e.g., sieving) the resulting $U_3Si_2$ particles to form the initial $U_3Si_2$ powder. Any suitable means (e.g., milling means) of pulverizing the preliminary $U_3Si_2$ structure may be employed. In some embodiments, the preliminary $U_3Si_2$ structure is subjected to a hammer milling process to pulverize the preliminary $U_3Si_2$ structure. The initial $U_3Si_2$ particles may be substantially discrete (e.g., discontinuous) from one another, and may each independently exhibit a particle size (e.g., a particle diameter) less than or equal to about five (5) millimeters (mm), such as less than or equal to about 1 mm, or less than or equal to about 850 micrometers (nm). Pulverized portions (e.g., particles, chunks, etc.) of the preliminary $U_3Si_2$ structure exhibiting a size (e.g., width, diameter, etc.) greater than about five (5) mm (or greater than or equal to about 1 mm, or greater than or equal to about 850 μm) may be subjected to additional pulverization (e.g., additional hammer milling) to reduce the size thereof and form additional $U_3Si_2$ particles for the initial $U_3Si_2$ powder.

Following formation, the initial $U_3Si_2$ powder may be subjected to an additional milling process to form a fine $U_3Si_2$ powder formed of and including fine $U_3Si_2$ particles. The fine $U_3Si_2$ particles may be substantially discrete (e.g., discontinuous) from one another, and may exhibit an average particle size less than the average particle size of the $U_3Si_2$ particles of the initial $U_3Si_2$ powder. By way of non-limiting example, the fine $U_3Si_2$ particles may exhibit an average particle size within a range of from about 0.5 micrometer (μm) to about 10 μm, such as from about 1 μm to about 9 μm, or from about 1 μm to about 5 μm. A majority of the fine $U_3Si_2$ particles may independently exhibit a particle size within a range of from about 2 μm to about 9 μm. In some embodiments, the average particle size of the fine $U_3Si_2$ particles is less than or equal to about 4 μm. The fine $U_3Si_2$ powder may exhibit a substantially mono-modal particle size distribution wherein each of the fine $U_3Si_2$ particles exhibits substantially the same average particle size as each other of the fine $U_3Si_2$ particles, or may exhibit a multi-modal (e.g., bimodal, trimodal, etc.) particle size distribution wherein at least some of the fine $U_3Si_2$ particles exhibit a different average particle size than at least some other of the fine $U_3Si_2$ particles. If the fine $U_3Si_2$ powder exhibits a multi-modal particle size distribution, relatively larger particles may be monodisperse (e.g., may each exhibit substantially the same particle size) or may be polydisperse (e.g., may exhibit a range of sizes and be averaged), and relatively smaller particles may be monodisperse or may be polydisperse.

The additional milling process may include pulverizing (e.g., crushing, milling, grounding, breaking down, etc.) the initial $U_3Si_2$ powder through at least one planetary milling process, and screening (e.g., sieving) the additional $U_3Si_2$ particles formed through the at least one planetary milling process to form the fine $U_3Si_2$ powder. In some embodiments, the additional milling process comprises a multi-step planetary milling process. By way of non-limiting example, and as described in further detail below, the initial $U_3Si_2$ particles may be combined with at least one milling aid, and then may be subjected to a series of different planetary milling processes (e.g., a series of different planetary ball milling processes) to form the fine $U_3Si_2$ powder.

The milling aid may comprise any material that facilitates and/or promotes the efficient pulverization of the initial $U_3Si_2$ particles (and of smaller $U_3Si_2$ particles subsequently formed therefrom), and that is compatible with the initial $U_3Si_2$ particles (and the smaller $U_3Si_2$ particles) and milling media(s) to be employed in the multi-step planetary milling process. As used herein, the term "compatible" means that a material does not undesirably react, decompose, or absorb another material, and also that the material does not undesirably impair the chemical and/or mechanical properties of the another material. The milling aid may, for example, comprise at least one lubricant formulated to substantially limit or even prevent the adhesion of the initial $U_3Si_2$ particles and/or of the smaller $U_3Si_2$ particles formed therefrom to surfaces of an apparatus being utilized for the multi-step planetary milling process. By way of non-limiting example, the milling aid may comprise at least one of oleic acid ($C_{18}H_{34}O_2$) and a polyethylene glycol (PEG) having a desirable molecular weight (e.g., a molecular weight greater than or equal to about 300 g/mol, such as about 300 g/mol, about 950 g/mol, or about 3350 g/mol). In some embodiments, the milling aid comprises PEG having a molecular weight of about 3350 g/mol. Any amount of the milling aid sufficient to facilitate and/or promote the efficient pulverization of the initial $U_3Si_2$ particles (and of the smaller $U_3Si_2$ particles formed therefrom) may be employed. By way of non-limiting example, the total amount of the milling aid combined with the initial $U_3Si_2$ particles may be less than or equal to about 0.2 wt % (e.g., from about 0.2 wt % to about 0.05 wt %, such as from about 0.2 wt % to about 0.1 wt %, or about 0.1 wt %) of the total amount of the initial $U_3Si_2$ particles being subjected to the multi-step planetary milling process. In some embodiments, the total amount of the milling aid combined with the initial $U_3Si_2$ particles is about 0.1 wt % of the total amount of the initial $U_3Si_2$ particles being subjected to the multi-step planetary milling process. The milling aid may be substantially homogeneously (e.g., substantially uniformly) distributed throughout the initial $U_3Si_2$ particles.

The multi-step planetary milling process may include subjecting a first mixture formed of and including the initial $U_3Si_2$ particles and the milling aid to a first planetary milling process (e.g., a first planetary ball milling process) to form a second mixture formed of and including relatively smaller $U_3Si_2$ particles each independently exhibiting an average particle size less than or equal to about 50 μm (e.g., less than or equal to about 40 μm, or less than about 40 μm) and the milling aid, and then subjecting the second mixture to a second planetary milling process (e.g., a second planetary ball milling process) to form a third mixture formed of and including the fine $U_3Si_2$ particles and the milling aid. As described in further detail below, one or more processing parameter(s) (e.g., milling media particle size(s), milling media material composition, etc.) of the second planetary milling process may be different than the processing parameters of the first planetary milling process.

The first planetary milling process may include pulverizing the first mixture formed of and including the initial $U_3Si_2$ particles and the milling aid with a milling container (e.g., a milling jar) of a planetary mill (e.g., a planetary ball mill) and a first milling media to form the second mixture formed of and including the smaller $U_3Si_2$ particles and the milling aid. For example, the first mixture and the first milling media may be provided into the milling container of the planetary mill, and then the first milling media and the milling container may be subjected to superimposed rotational movements (e.g., Coriolis forces) for a sufficient period of time to convert (e.g., pulverize, crush, grind, etc.) the initial $U_3Si_2$ particles into the smaller $U_3Si_2$ particles through a combination of frictional and impact forces. The milling container and first milling media may each independently be formed of and include at least one hard material configured and formulated to convert the initial $U_3Si_2$ particles into the smaller $U_3Si_2$ particles without substantially contaminating the smaller $U_3Si_2$ particles. The milling container may be lined with hard material, and the first milling media may be formed of and include particles of hard material. The hard material of the milling container may be substantially the same as or may be different than that of the first milling media. By way of non-limiting example, the milling container may be lined with partially stabilized zirconia (PSZ), and the first milling media may be form of and include PSZ particles. The average particle size of the hard material particles (e.g., PSZ particles) of the first milling media may be less than or equal to about 10 mm, such as less than or equal to about 5 mm, or about 5 mm. Any amount of the first milling media sufficient to substantially convert the initial $U_3Si_2$ particles to the smaller $U_3Si_2$ particles through the first planetary milling process may be utilized. For example, the first milling media may occupy (e.g., fill) from about 10 percent by volume (vol %) to about 20 vol % of a milling cavity defined by the milling container, and the first mixture may occupy from about 10 vol % to about 40 vol % of the milling cavity.

Following formation, the second mixture may be separated (e.g., sieved) from the first milling media and subjected to the second planetary milling process. The second planetary milling process may include pulverizing the second mixture with a milling container (e.g., a milling jar) of a planetary mill (e.g., a planetary ball mill) and a second milling media to form the third mixture formed of and including the fine $U_3Si_2$ particles and the milling aid. For example, the second mixture and the second milling media may be provided into the milling container of the planetary mill utilized in the first milling process (and/or into a milling container of a different planetary mill), and the second milling media and the milling container may be subjected to superimposed rotational movements for a sufficient period of time to convert the smaller $U_3Si_2$ particles into the fine $U_3Si_2$ particles through a combination of frictional and impact forces. The second milling media may be formed of and include particles of at least one hard material configured and formulated to convert the smaller $U_3Si_2$ particles into the fine $U_3Si_2$ particles without substantially contaminating the fine $U_3Si_2$ particles. The material composition of the hard material particles of the second milling media may be substantially the same as or may be different than that of the hard material particles of the first milling media. By way of non-limiting example, the first milling media and the second milling media may each be formed of and include PSZ particles. The average particle size of the hard material particles of second milling media may be smaller than the average particle size of the hard material particles of the first milling media. By way of non-limiting example, the average particle size of the second milling media may be less than or equal to about 1 mm, such as about 1 mm. Similar to the first milling media, any amount of the second milling media sufficient to substantially convert the smaller $U_3Si_2$ particles to the fine $U_3Si_2$ particles through the second planetary milling process may be utilized. For example, the second milling media may occupy (e.g., fill) from about 10 percent by volume (vol %) to about 20 vol % of the milling cavity defined by the milling container, and the second mixture may occupy from about 10 vol % to about 40 vol % of the milling cavity.

While various embodiments herein describe the multi-step planetary milling process as including a first planetary milling process and a second planetary milling process, the multi-step planetary milling process may, alternatively, include a different number of planetary milling processes to form the fine $U_3Si_2$ particles from the initial $U_3Si_2$ particles. For example, the multi-step planetary milling process may employ more than two planetary milling process (e.g., three or more planetary milling processes) to form the fine $U_3Si_2$ particles from the initial $U_3Si_2$ particles. The number of planetary milling processes utilized in the multi-step planetary milling process, as well as the operational parameters (e.g., milling media properties) of each of the planetary milling processes, may at least partially depend on the particle size distribution and average particle size of the initial $U_3Si_2$ particles, as well as on the desired particle size distribution and the desired average particle size of the fine $U_3Si_2$ particles to be formed therefrom. Regardless of the number of planetary milling processes utilized in the multi-step planetary milling process, sequentially later planetary milling processes may utilize progressively smaller milling media particle sizes relative to sequentially earlier planetary milling processes.

Following formation, the third mixture including the fine $U_3Si_2$ particles and the milling aid may be separated (e.g., sieved) from the second milling media and subjected to a volatilization process to substantially remove the milling aid from the fine $U_3Si_2$ particles and leave the fine $U_3Si_2$ powder. The fine $U_3Si_2$ powder may be substantially free of the milling aid. The volatilization process may, for example, comprise a thermal anneal under negative pressure (e.g., vacuum). The thermal anneal may expose the third mixture to a temperature greater than or equal to a decomposition temperature (e.g., a self-ignition temperature) of the milling aid. By way of non-limiting example, the third mixture may be exposed to a temperature greater than or equal to about 100° C. (e.g., greater than or equal to about 200° C., greater than or equal to about 300° C., or greater than or equal to about 350° C.) under negative pressure for a sufficient amount of time to substantially volatize and remove the milling aid and leave the fine $U_3Si_2$ powder. In some embodiments, such as in embodiments wherein the milling aid comprises PEG, the third mixture is exposed to a temperature of about 350° C. under negative pressure for about one (1) hour to volatilize and remove the milling aid from the fine $U_3Si_2$ particles. Removing the milling aid may enhance the green strength of a green $U_3Si_2$ structure subsequently formed from the fine $U_3Si_2$ powder, as described in further detail below.

The particle size distribution and relatively small (e.g., fine) average particle size of the fine $U_3Si_2$ particles of the fine $U_3Si_2$ powder may facilitate the consistent and reproducible formation of relatively high density $U_3Si_2$ structures (e.g., $U_3Si_2$ pellets) through subsequent processing (e.g., pressing, sintering, etc.), as described in further detail below. The fine $U_3Si_2$ particles of the fine $U_3Si_2$ powder may facilitate the formation of relatively higher high density $U_3Si_2$ structures than those that may be formed using $U_3Si_2$ powders exhibiting a different particle size distribution and/or an average particle size larger than the average particle size of the fine $U_3Si_2$ particles. Tailoring the particle size distribution and the average particle size of the fine $U_3Si_2$ particles of the fine $U_3Si_2$ powder may facilitate tailoring the density of an $U_3Si_2$ structure subsequently formed therefrom to a desired application (e.g., a desired LWR application) of the $U_3Si_2$ structure.

With continued reference to FIG. 1, the pressing process 110 includes forming the fine $U_3Si_2$ powder into at least one green (e.g., unsintered) $U_3Si_2$ structure exhibiting a desired shape and a desired size. For example, at least a portion of the fine $U_3Si_2$ powder may be provided into a die cavity exhibiting a desired shape and a desired size, and then pressure may be applied to the fine $U_3Si_2$ powder within the die cavity to form a green $U_3Si_2$ structure having a green density within a range of from about 7.32 g/cm$^3$ (e.g., about 60 percent of the theoretical density of $U_3Si_2$) to about 7.93 g/cm$^3$ (e.g., about 65 percent of the theoretical density of $U_3Si_2$). Any applied pressure able to achieve a desired green density of the green $U_3Si_2$ structure may be utilized. By way of non-limiting example, a pressure within a range of from about 120 MPa to about 250 MPa (e.g., from about 124 MPa to about 248 MPa, or from about 124 MPa to about 156 MPa) may be applied to the fine $U_3Si_2$ powder within the die cavity to form the green $U_3Si_2$ structure. In some embodiments, the pressure applied to the fine $U_3Si_2$ powder within the die cavity is within a range of from about 124 MPa to about 156 MPa. Any suitable means (e.g., two floating punches) of applying the pressure to the fine $U_3Si_2$ powder within the die cavity may be employed. The shape and the size of the die cavity (and, hence, the shape and the size of the green $U_3Si_2$ structure) may be selected at least partially based on a desired shape and a desired size of at least one of a sintered $U_3Si_2$ structure to be subsequently formed from the green $U_3Si_2$ structure. In some embodiments, a four (4) gram charge of the fine $U_3Si_2$ powder is provided into a 9.525 mm (0.375 inch) diameter die cavity and pressed to form a green $U_3Si_2$ structure exhibiting an aspect (e.g., length to diameter) ratio of less than or equal to about 1.0. Prior to providing the fine $U_3Si_2$ powder into the die cavity, a lubricant (e.g., zinc stearate) may be provided on or over surfaces defining the die cavity.

Optionally, the fine $U_3Si_2$ powder may be combined with at least one binder material prior to forming the green $U_3Si_2$ structure. The binder material may be a material that is compatible with the fine $U_3Si_2$ powder and that promotes and/or facilitates the formation of the green $U_3Si_2$ structure. The binder material may, for example, comprise a non-ionic, high molecular weight (e.g., greater than or equal to about 100,000 g/mol, such as greater than or equal to about 1,000,000 g/mol, greater than or equal to about 2,000,000 g/mol, or greater than or equal to about 4,000,000 g/mol) polymeric material, such as a non-ionic high molecular weight poly(ethylene oxide). Suitable binder materials are commercially available from numerous sources including, but not limited to, Dow Chemical Co. (Midland, Mich.) under the POLYOX® tradename. In some embodiments, the binder material comprises POLYOX® WSR-301. The amount of binder material combined with (e.g., added to) the fine $U_3Si_2$ powder may be less than or equal to about 0.2 wt % (e.g., from about 0.2 wt % to about 0.05 wt %, such as from about 0.2 wt % to about 0.1 wt %, or about 0.1 wt %) of the total amount of the fine $U_3Si_2$ powder. In some embodiments, the total amount of the binder material combined with the fine $U_3Si_2$ powder is about 0.1 wt % of the total amount of the fine $U_3Si_2$ powder.

Next, the at least one sintering process 112 includes sintering the at least one green $U_3Si_2$ structure under negative pressure (e.g., from about $10^{-3}$ millibar (mbar) to about $10^{-5}$ mbar, such as from about $10^{-3}$ mbar to about $10^{-4}$ mbar) and/or in an inert atmosphere (e.g., an argon atmosphere) to modify one or more properties (e.g., material density, material porosity, residual stresses, structural defects, etc.) of the green $U_3Si_2$ structure and form at least one sintered $U_3Si_2$ structure. The sintering process 112 may densify the $U_3Si_2$ of the green $U_3Si_2$ structure and facilitate at least one of solid state bonding and liquid phase bonding at surfaces of the fine $U_3Si_2$ particles. The temperature and the duration of the sintering process 112 may be selected at least partially based on the particle size distribution and green density of the green $U_3Si_2$ structure to achieve a sintered $U_3Si_2$ structure having a desired density, such as a density greater than or equal to about 11.47 g/cm$^3$ (e.g., about 94.0 percent of the theoretical density of $U_3Si_2$), greater than or equal to about 11.65 g/cm$^3$ (e.g., about 95.5 percent of the theoretical density of $U_3Si_2$), greater than or equal to about 11.71 g/cm$^3$ (e.g., about 96 percent of the theoretical density of $U_3Si_2$), greater than or equal to about 11.77 g/cm$^3$ (e.g., about 96.5 percent of the theoretical density of $U_3Si_2$), greater than or equal to about 11.83 g/cm$^3$ (e.g., about 97.0 percent of the theoretical density of $U_3Si_2$), greater than or equal to about 11.90 g/cm$^3$ (e.g., about 97.5 percent of the theoretical density of $U_3Si_2$), or greater than or equal to about 11.96 g/cm$^3$ (e.g., about 98.0 percent of the theoretical density of $U_3Si_2$). By way of non-limiting example, the sintering process 112 may include subjecting the green $U_3Si_2$ structure to a temperature within a range of from about 1200° C. to about 1550° C. (e.g., from about 1200° C. to about 1500° C.) for a duration within a range of from about 2 hours to about 8 hours (e.g., from about 3 hours to about 6 hours, or from about 4 hours to about 5 hours) to form the sintered $U_3Si_2$ structure. The green $U_3Si_2$ structure may be provided on or over refractory metal pellets (e.g., pellets formed of and including at least one of tantalum, molybdenum, and tungsten) and held within a refractory metal container (e.g., a crucible formed of and including at least one of tantalum, molybdenum, and tungsten) during the sintering process 112. The refractory metal pellets and the refractory metal container may serve as an oxygen getter during the sintering process 112.

The green $U_3Si_2$ structure may be exposed to a single (e.g., only one) sintering process 112 to form the sintered $U_3Si_2$ structure, or may be exposed to multiple sintering processes 112 to form the sintered $U_3Si_2$ structure. If multiple sintering processes 112 are utilized, an initial sintering process 112 may partially anneal the green $U_3Si_2$ structure to modify one or more physical properties (e.g., material density, material porosity, residual stresses, structural defects, etc.) of the green $U_3Si_2$ structure and form a partially sintered $U_3Si_2$ structure, and at least one other sintering process 112 may further sinter the partially sintered $U_3Si_2$ structure to modify one or more physical properties of the partially sintered $U_3Si_2$ structure and form the sintered $U_3Si_2$ structure. Each of the sintering processes 112 may be substantially the same (e.g., utilize substantially the same temperature(s), pressure(s), duration(s), ambient condition(s), etc.), or at least one of the sintering processes 112 may be different than at least one other of the sintering processes 112 (e.g., utilize at least one of different temperature(s), different pressure(s), different duration(s), different ambient condition(s), etc.). In some embodiments, the green $U_3Si_2$ structure is exposed to a single sintering process 112 to form the conditioned sintered $U_3Si_2$ structure.

By way of non-limiting example, in some embodiments, the sintering process 112 includes providing the green $U_3Si_2$ structure over tantalum (Ta) pellets within a Ta crucible, providing the Ta crucible containing the green $U_3Si_2$ structure within in a chamber of a vacuum furnace, applying negative pressure within a range of from about $10^{-3}$ mbar to about $10^{-4}$ mbar within the chamber, increasing the temperature within the chamber at about 25° C. per minute to about 600° C., holding the temperature within the chamber at about 600° C. for about two (2) hours, increasing the temperature within the chamber at about 30° C. per minute to about 1500° C., holding the temperature within the chamber at about 1500° C. for about four (4) hours, and then allowing the chamber to cool naturally. As another non-limiting example, in additional embodiments, the sintering process 112 includes providing the green $U_3Si_2$ structure over Ta pellets within a Ta crucible, providing the Ta crucible containing the green $U_3Si_2$ structure within in a chamber of an argon (Ar) atmosphere furnace, providing an Ar atmosphere including less than or equal to about 40 parts per million (ppm) oxygen gas ($O_2$), increasing the temperature within the chamber at about 25° C. per minute to about 600° C., holding the temperature within the chamber at about 600° C. for about two (2) hours, increasing the temperature within the chamber at about 30° C. per minute to about 1500° C., holding the temperature within the chamber at about 1500° C. for about five (5) hours, and then allowing the chamber to cool naturally.

With continued reference to FIG. 1, the machining process 114 includes modifying at least one of a shape and one or more dimensions of the sintered $U_3Si_2$ structure to form a machined $U_3Si_2$ structure exhibiting a desired shape and a desired size. As a non-limiting example, peripheral portions of the sintered $U_3Si_2$ structure may be removed (e.g., grinded, etched, etc.) to provide a machined $U_3Si_2$ structure exhibiting a diameter and a height suitable for a desired application (e.g., a desired LWR application). In some embodiments, peripheral portions of the sintered $U_3Si_2$ structure are removed to form a machined $U_3Si_2$ structure exhibiting a diameter of about 8.19 mm (about 0.3225 inch) and a height of about 6.12 mm (about 0.241 inch). As another non-limiting example, a central portion of the sintered $U_3Si_2$ structure may be removed to form a machined $U_3Si_2$ structure exhibiting a central opening (e.g., hole, aperture, via, etc.) extending at least partially therethrough. The central opening may, for example, be shaped and sized to receive one or more melt wire(s) for temperature monitoring during a desired application (e.g., a desired LWR application) of the machined $U_3Si_2$ structure. In some embodiments, a central portion of the sintered $U_3Si_2$ structure is removed to form a central opening exhibiting a diameter and a depth sufficient to receive and hold a melt wire having a diameter of about 1.6 mm (about 0.0630 inch). In additional embodiments, the green $U_3Si_2$ structure is formed with (e.g., shaped during pressing) and/or subsequently processed (e.g., drilled) to exhibit a central hole such that the sintered $U_3Si_2$ structure formed therefrom already exhibits a central hole. In such embodiments, the machining process 114 may, optionally, include modifying the dimensions of the central hole of the sintered $U_3Si_2$ structure. In further embodiments, such as in embodiments wherein a different method of monitoring temperature during a desired application is desired, a central hole is omitted (e.g., absent) from each of the sintered $U_3Si_2$ structure and the machined $U_3Si_2$ structure.

By way of non-limiting example, the machining process 114 may include subjecting the sintered $U_3Si_2$ structure to a centerless grinding process to form the machined $U_3Si_2$ structure exhibiting a desired diameter and a desired height. In some embodiments, the centerless grinding process includes providing the sintered $U_3Si_2$ structure onto a guide exposing a portion of a peripheral sidewall of the sintered $U_3Si_2$ structure, moving and rotating (e.g., spinning) the sintered $U_3Si_2$ structure along the guide using a feed wheel, and removing a portion of the peripheral sidewall using a grinding wheel (e.g., a diamond resin grinding wheel) operatively associated with the guide. The grinding wheel may remove (e.g., grind) a portion of the peripheral sidewall of the sintered $U_3Si_2$ structure during each pass of the sintered $U_3Si_2$ structure across the grinding wheel. The amount of the sintered $U_3Si_2$ structure removed by the grinding wheel during each pass may be controlled to achieve the desired diameter of the machined $U_3Si_2$ structure. The removal (e.g., grinding) rate of the grinding wheel may be substantially constant, or may be varied. The removal rate of the grinding wheel may, for example, be decreased as the desired diameter of the machined $U_3Si_2$ structure is approached. As a non-limiting example, a maximum grinding rate of the grinding wheel may initially be about 6.35 μm (0.00025 in) per pass of the sintered $U_3Si_2$ structure, and may be adjusted to about 2.54 μm (0.0001 in) per pass of the sintered $U_3Si_2$ structure as the diameter of the sintered $U_3Si_2$ structure approaches the desired diameter of the machined $U_3Si_2$ structure. In additional embodiments, the centerless grinding process includes providing the sintered $U_3Si_2$ structure into a drum operatively associated with a feed wheel positioned and configured to rotate the drum, rotating the drum with the feed wheel, and removing one or more portion(s) of at least one of a top surface and a bottom surface of the sintered $U_3Si_2$ structure using a grinding wheel (e.g., a diametrical grinding wheel, such as a diametrical diamond resin grinding wheel) operatively associated with the rotating drum.

By way of additional non-limiting example, the machining process 114 may include subjecting the sintered $U_3Si_2$ structure to a drilling process to form the machined $U_3Si_2$ structure exhibiting a central opening having a desired diameter and a desired depth. In some embodiments, the drilling process includes providing the sintered $U_3Si_2$ structure onto a support structure (e.g., a support bar) within an inside containment structure (e.g., a collet), and drilling a central region of the sintered $U_3Si_2$ structure to a desired depth using a drill bit exhibiting a desired diameter and formed of and including a hard material (e.g., titanium nitride, tungsten carbide, diamond, combinations thereof, etc.).

Figure 2:
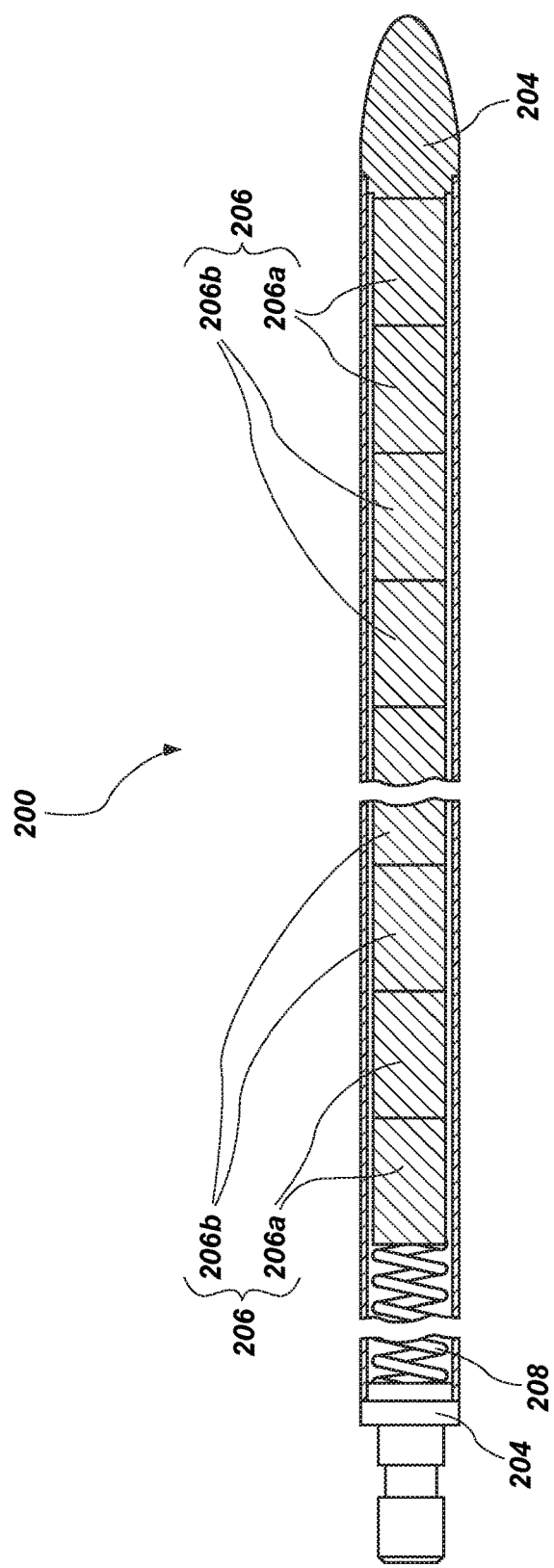
FIG. 2 is a longitudinal, cross-sectional view of a fuel rod for use in an LWR, in accordance with embodiments of the disclosure.

FIG. 2 is a longitudinal, cross-sectional view of a fuel rod 200, in accordance with embodiments of the disclosure. The fuel rod 200 may include a cladding tube 204 exhibiting caps 204 at opposing ends thereof, and $U_3Si_2$ structures 206 (e.g., $U_3Si_2$ pellets) stacked within the hollow cladding tube 204. The $U_3Si_2$ structures 206 may be pressed against one another by way of a spring 208 located at one of the ends of the cladding tube 204. Each of the $U_3Si_2$ structures 206 may independently be formed in accordance with the methods previously described herein with respect to FIG. 1. The relative high density (e.g., greater than about equal to about 11.47 g/cm³, such as greater than about equal to about 11.65 g/cm³, greater than or equal to about 11.71 g/cm³, greater than or equal to about 11.77 g/cm³, greater than or equal to about 11.83 g/cm³, greater than or equal to about 11.90 g/cm³, or greater than or equal to about 11.96 g/cm³) and increased uranium loading of the $U_3Si_2$ structures as compared to conventional fissile material structures (e.g., $UO_2$ structures) may permit the cladding tube 204 to be formed of and include an advanced cladding material such as silicon carbide (SiC) and/or an iron-based alloy (e.g., an FeCrAl steel) having a neutronic penalty relative to zirconium-based alloys conventionally utilized as cladding materials. In additional embodiments, the cladding tube 204 may be formed of and include a cladding material (e.g., a zirconium-based alloy, such as Zircaloy-2, Zircaloy-4, ZrSn, ZIRLO®, etc.) conventionally utilized to clad fissile material structures. Suitable conventional cladding materials are commercially available from numerous sources, such as from Westinghouse Electric Company LLC (Cranberry Township, Pa.). The fuel rod 200 may be configured to operate at a variety of initial power (e.g., greater than or equal to about 275 W/cm, such as within a range of from about 275 W/cm to about 461 W/cm) and temperature (e.g., greater than or equal to about 600° C. centerline, such as within a range of from about 600° C. centerline to about 1000° C. centerline) conditions, and to remain under irradiation for a variety of burnups (e.g., greater than or equal to about 20 GWd/tU, such as within a range of from about 20 GWd/tU to about 70 GWd/tU). As shown in FIG. 2, in some embodiments, the fuel rod 200 includes opposing depleted (e.g., 0.41% U-235) $U_3Si_2$ structures 206a at ends of the stack of $U_3Si_2$ structures 206, and enriched (e.g., 5.44% U-235) $U_3Si_2$ structures 206b between the opposing depleted $U_3Si_2$ structures 206a.

Figure 3:
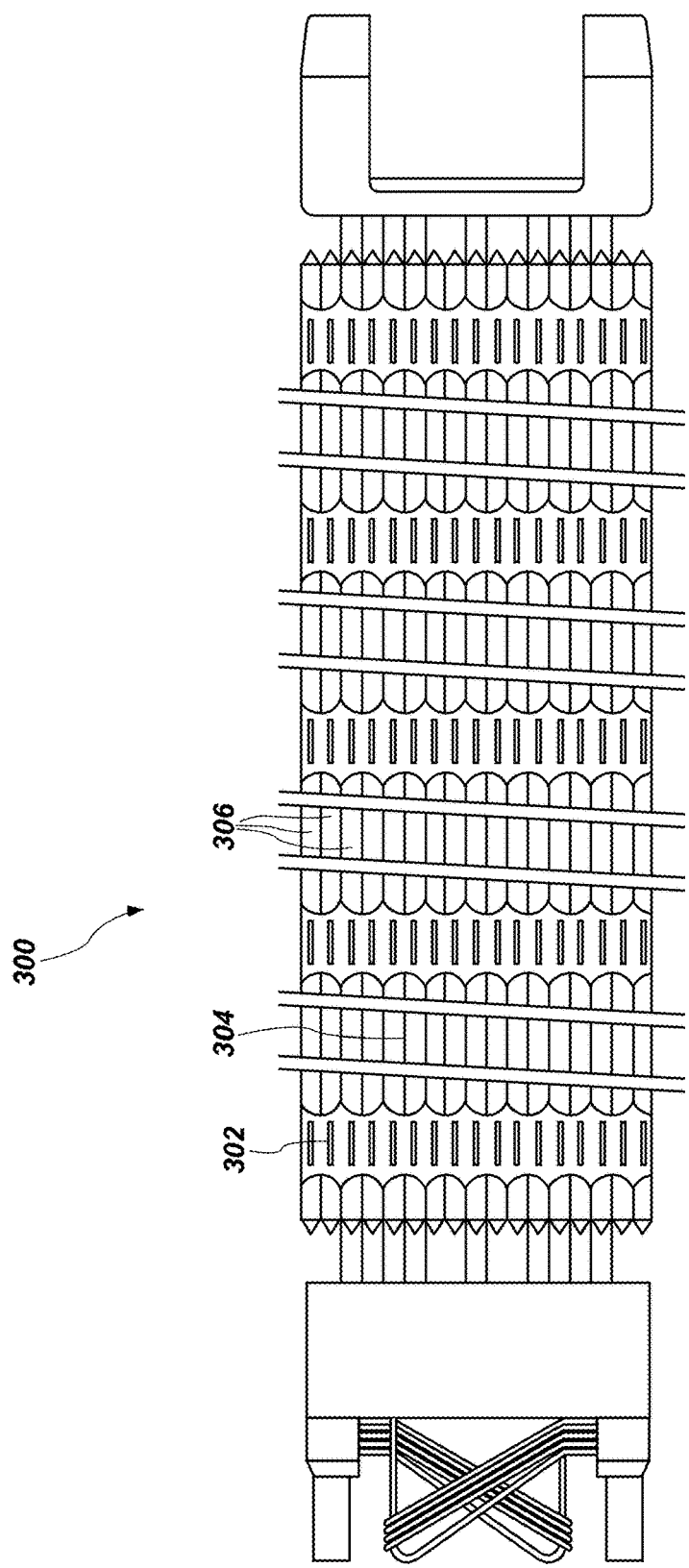
FIG. 3 is a longitudinal schematic view of a fuel assembly for use in LWR, in accordance with embodiments of the disclosure.

FIG. 3 is a longitudinal schematic view of a fuel assembly 300, in accordance with embodiments of the disclosure. The fuel assembly 300 may be configured for use in an LWR, such as a PWR. The fuel assembly 300 may include a frame 302, and bundles 304 of fuel rods 306 supported by the frame 302. One or more of the fuel rods 306 may be substantially similar to the fuel rod 200 previously described herein with respect to FIG. 2.

The methods of the disclosure facilitate the formation of $U_3Si_2$ structures (e.g., $U_3Si_2$ pellets) exhibiting enhanced properties (e.g., higher density, increased uranium loading, increased thermal conductivity, etc.) for LWR applications relative to fissile material structures (e.g., $UO_2$ pellets) conventionally utilized for LWR applications. Embodiments of the disclosure may be used to provide virtually infinite flexibility to tailor the properties of an $U_3Si_2$ structure to match particular requirements of a desired LWR application. For example, one or more of particle size distribution (e.g., $U_3Si_2$ particle size distribution), average particle size (e.g., average $U_3Si_2$ particle size), additive (e.g., lubricants, binders, etc.) types and amounts, green denisities (e.g., green $U_3Si_2$ structure density), sintering parameters (e.g., temperatures, environmental conditions, etc.), and machining parameters may be used to form an $U_3Si_2$ structure exhibiting properties (e.g., density) tailored to the requirements of a desired LWR application. The $U_3Si_2$ structures formed by the methods of the disclosure may enable power uprates in LWRs, extend cycle length in LWRs, reduce uranium enrichment requirements for LWRs, and/or reduce fuel rod centerline temperatures in LWRs, which may reduce costs, increase safety, and/or increase the efficiency of LWR applications.

The following examples serve to explain embodiments of the present disclosure in more detail. The examples are not to be construed as being exhaustive or exclusive as to the scope of the disclosure.

EXAMPLES

Example 1

Formation of a Preliminary $U_3Si_2$ Structure

Figure 4:
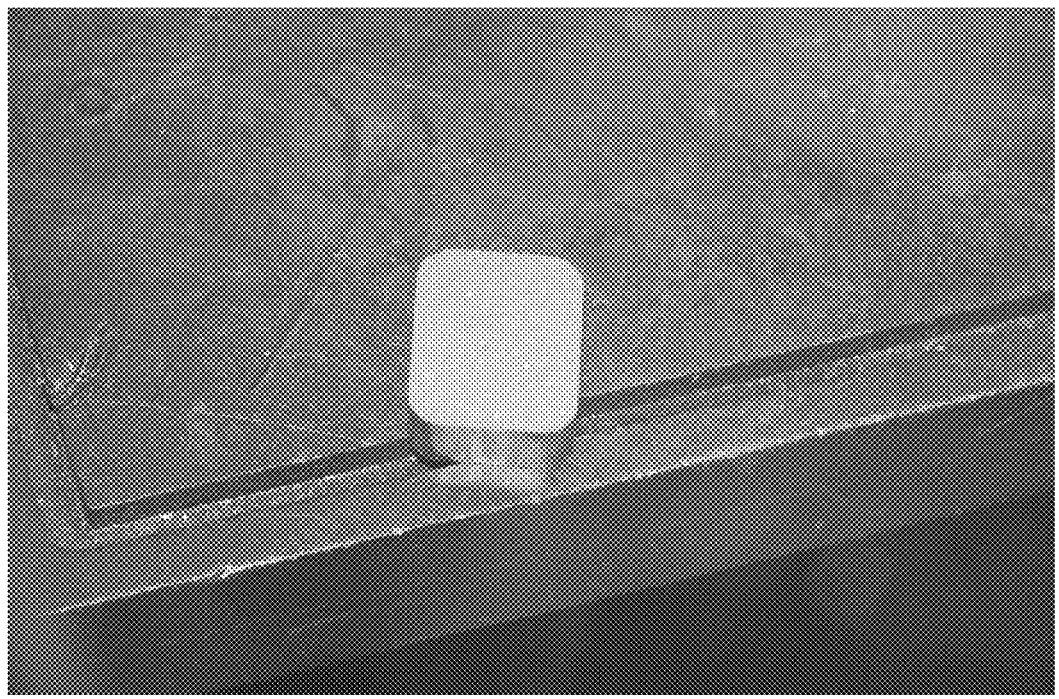
FIG. 4 is a photograph showing a perspective view of a rectangular compact of uranium and silicon, as described in Example 1.
Figure 5:
FIG. 5 is a photograph showing a perspective view of a preliminary $U_3Si_2$ structure, as described in Example 1.
Figure 6:
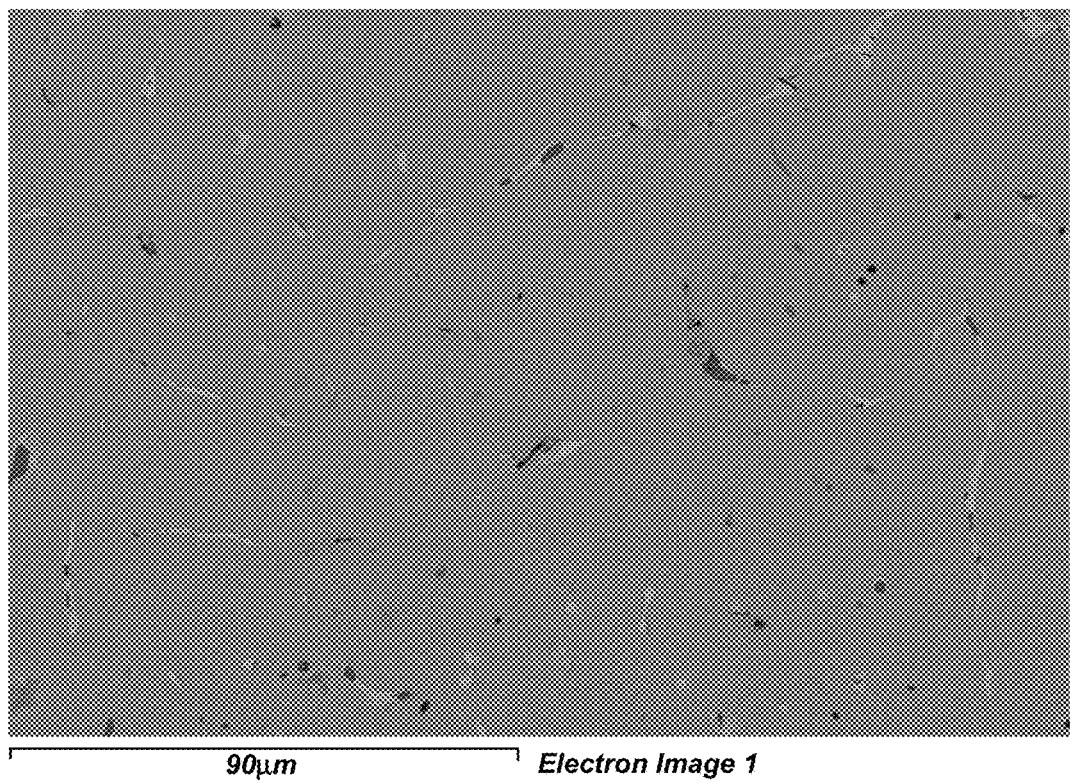
FIG. 6 is a scanning electron micrograph of a preliminary $U_3Si_2$ structure, as described in Example 1.

Feedstock uranium rods were washed in a weak $HNO_3$ (10 wt %) solution to remove any oxide layers thereon, and were then sheared into about 10 g to about 25 g portions. The uranium portions were subjected to a hydriding/dehydriding process including heating the uranium portions at 225° C. in a hydrogen atmosphere and followed by heating at 225° C. under vacuum. Uranium powder formed by the hydriding/dehydriding process was sieved through a 300 μm sieve, and then combined with substantially pure (99.999 wt %) silicon powder exhibiting a particle size distribution of from 44 μm to 149 μm to form a uranium/silicon mixture including 92.7 wt % uranium and 7.3 wt % silicon. The uranium/silicon mixture was then compressed in a rectangular compact using a hand press and an applied pressure of about 225 MPa. FIG. 4 is a photograph showing a perspective view of the rectangular compact that was formed. The rectangular compact was rapidly heated to 1450° C. in an oven, held at 1450° C. for about 30 minutes, and then allowed to naturally cool. Thereafter, the rectangular compact was provided into a water-cooled copper hearth, an electrode was provided over the rectangular compact and a current of about 150 Amps was applied to arc melt the rectangular compact and form a preliminary $U_3Si_2$ structure. The preliminary $U_3Si_2$ structure was flipped and arc re-melted using an applied current of about 300 Amps, and then flipped again and arc re-melted again using an applied current of about 300 Amps. FIG. 5 is a photograph showing a perspective view of the preliminary $U_3Si_2$ structure formed from the rectangular compact through the arc melting and re-melting process. FIG. 6 is a Scanning Electron Microscope (SEM) of the preliminary $U_3Si_2$ structure formed through the arc melting and re-melting process.

Example 2

Comminution Processing

Figure 7:
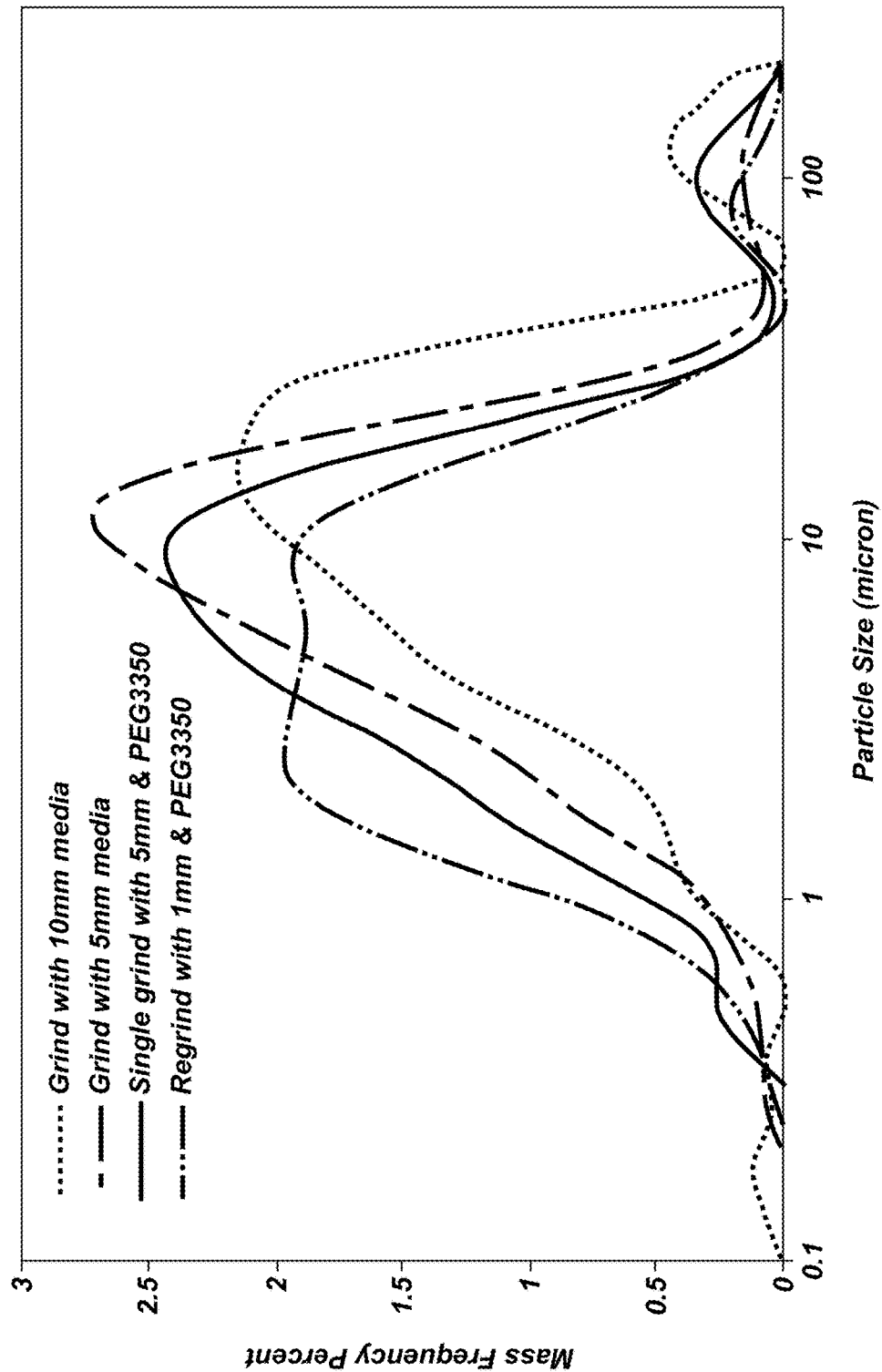
FIG. 7 is a graph showing particle size distributions different $U_3Si_2$ powders, as described in Example 2.

Preliminary $U_3Si_2$ structures formed according to the process described in Example 1 were subjected to different comminution processes to yield different $U_3Si_2$ powders. The preliminary $U_3Si_2$ structures were each hammer milled and sieved into an initial $U_3Si_2$ powder formed of and including initial $U_3Si_2$ particles each independently exhibiting a particle size (e.g., a particle diameter) less than or equal to about 850 μm. A first portion of the initial $U_3Si_2$ powder was subjected to a first milling process including a single planetary milling act utilizing a PSZ-lined milling jar and PSZ milling media having an average particle size of about 10 mm. A second portion of the initial $U_3Si_2$ powder was subjected to a second milling process including a single planetary milling act utilizing a PSZ-lined milling jar and PSZ milling media having an average particle size of about 5 mm. A third portion of the initial $U_3Si_2$ particles was subjected to a third milling process including combining the initial $U_3Si_2$ particles with PEG having a molecular weight of about 3350 g/mol (PEG3350) (an amount of PEG3350 equal to about 0.1 wt % of the total amount of initial $U_3Si_2$ particles) to form a mixture, and then subjecting the mixture to a single planetary milling act utilizing a PSZ-lined milling jar and PSZ milling media having an average particle size of about 5 mm. A fourth portion of the initial $U_3Si_2$ particles was subjected to a fourth milling process including combining the initial $U_3Si_2$ particles with PEG3350 (an amount of PEG3350 equal to about 0.1 wt % of the total amount of initial $U_3Si_2$ particles) to form a first mixture, subjecting the first mixture to a first planetary milling process using a PSZ-lined milling jar and a first PSZ milling media having an average particle size of about 5 mm to form a second mixture including smaller $U_3Si_2$ particles and PEG3350, separating the second mixture from the first PSZ milling media using a 39 nm sieve, and then subjecting the separated second mixture to a second planetary milling process using a PSZ-lined milling jar and a second PSZ milling media having an average particle size of about 1 mm to form a third mixture including fine $U_3Si_2$ particles and PEG3350. The particle size distributions of the $U_3Si_2$ powders resulting from the different comminution processes above were then evaluated using a Micromeritics SEDIGRAPH® III (available from Micromeritics Instrument Corporation of Norcross, Ga.) utilizing sedimentation theory and x-ray attenuation to calculate mass percent of particles in a sample. FIG. 7 is a graph showing the particle size distribution of each of the different $U_3Si_2$ powders resulting from the different comminution processes. The $U_3Si_2$ powder resulting from the fourth milling process yielded the highest density sintered $U_3Si_2$ structures following subsequent processing.

Example 3

Formation of Green $U_3Si_2$ Structures and Sintered $U_3Si_2$ Structures

Figure 8:
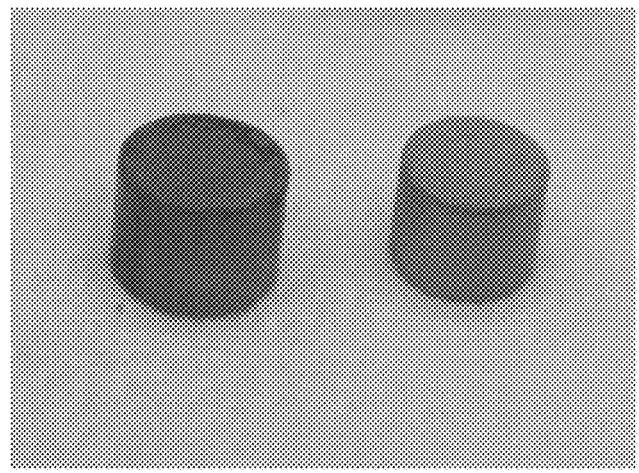
FIG. 8 is a photograph showing a perspective view of a green $U_3Si_2$ structure (left-hand side) and a sintered $U_3Si_2$ structure (right-hand side), as described in Example 3.

A mixture of fine $U_3Si_2$ particles and PEG3350 formed according to the fourth milling process described in Example 3 was heated at a temperature of about 350° C. under negative pressure for about one (1) hour to volatilize and remove the PEG3350 from the fine $U_3Si_2$ particles. The separated fine $U_3Si_2$ particles were then combined with POLYOX® WSR-301 (an amount of POLYOX® WSR-301 equal to about 0.1 wt % of the total amount of fine $U_3Si_2$ particles). 4 g charges of the resulting mixture were provided into 9.525 mm die cavities lubricated with zinc stearate and then pressed at about 124 MPa to form green $U_3Si_2$ structures each having an aspect ratio of about 1.0. Some of the green $U_3Si_2$ structures were then provided over Ta pellets within a Ta crucible, the Ta crucible was provided within in a chamber of a vacuum furnace, and negative pressure within a range of from about $10^{-3}$ mbar to about $10^{-4}$ mbar was achieved within the chamber. The temperature within the chamber was then increased up at about 25° C. per minute to about 600° C., held at about 600° C. for about two (2) hours, increased at about 30° C. per minute to about 1500° C., and held at about 1500° C. for about four (4) hours to form sintered $U_3Si_2$ structures. The sintered $U_3Si_2$ structures exhibited densities within a range of from about 11.72 g/cm$^3$ (e.g., about 96.1 percent of the theoretical density of $U_3Si_2$) to about 11.93 g/cm$^3$ (e.g., about 97.8 percent of the theoretical density of $U_3Si_2$), with an average density of about 11.82 g/cm$^3$ (e.g., about 96.9 percent of the theoretical density of $U_3Si_2$). FIG. 8 is a photograph showing a perspective view of one of the green $U_3Si_2$ structures (left-hand side) beside one of the sintered $U_3Si_2$ structures (right-hand side).

Example 4

Formation of Machined $U_3Si_2$ Structures

Sintered $U_3Si_2$ structures formed in accordance with embodiments of the disclosure were subjected to different machining processes.

Figure 9:
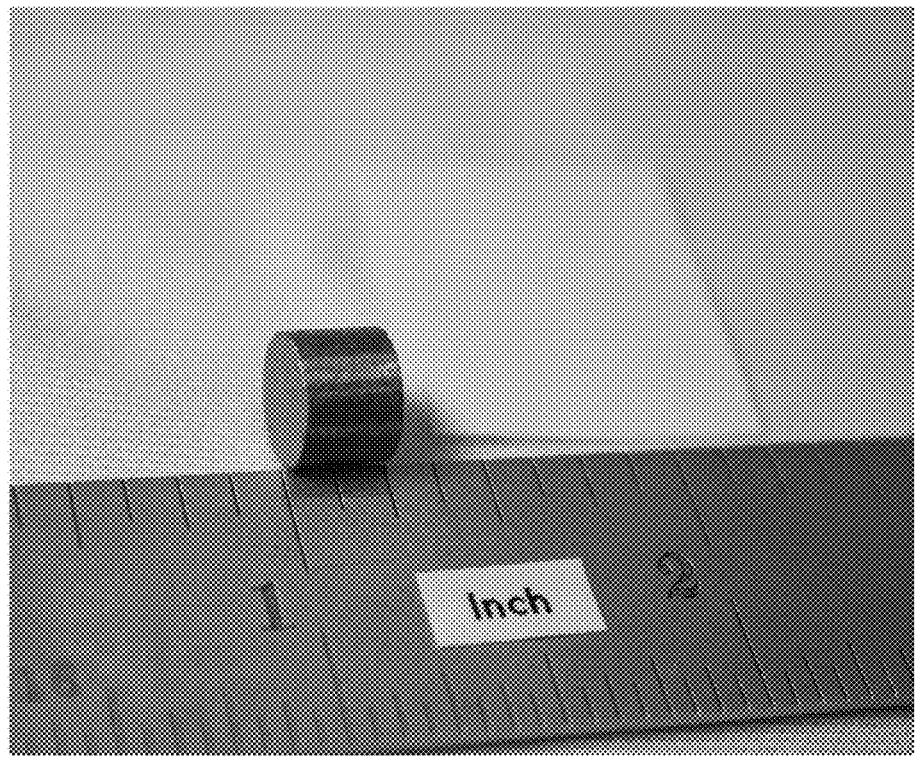
FIG. 9 is a photograph showing a perspective view of a machined $U_3Si_2$ structure, as described in Example 4.

In a first machining process, a sintered $U_3Si_2$ structure was subjected to a centerless grinding process that included providing the sintered $U_3Si_2$ structure onto a guide exposing a portion of a peripheral sidewall of the sintered $U_3Si_2$ structure. The sintered $U_3Si_2$ structure was then rotated and moved across a rotating diamond resin grinding wheel using a feed wheel. A portion of the peripheral sidewall of the sintered $U_3Si_2$ structure was initially removed at a rate of about 6.35 µm (about 0.00025 in) per pass across the diamond resin grinding wheel, and then at a rate of about 2.54 µm (about 0.0001 in) per pass across the diamond resin grinding wheel. The resulting reduced-diameter $U_3Si_2$ structure had an average diameter of about 8.19 mm (about 0.3225 in). The reduced-diameter $U_3Si_2$ structure was then subjected to another centerless grinding process that included providing the reduced-diameter $U_3Si_2$ structure into a drum operatively associated with a feed wheel positioned and configured to rotate the drum, rotating the drum with the feed wheel, and removing portions of a top surface and a bottom surface of the reduced-diameter $U_3Si_2$ structure using a rotating diametrical diamond resin grinding wheel. The resulting machined $U_3Si_2$ structure had a height of about 6.12 mm (about 0.241 in). FIG. 9 is a photograph showing a perspective view of the machined $U_3Si_2$ structure formed through the first machining process.

Figure 10:
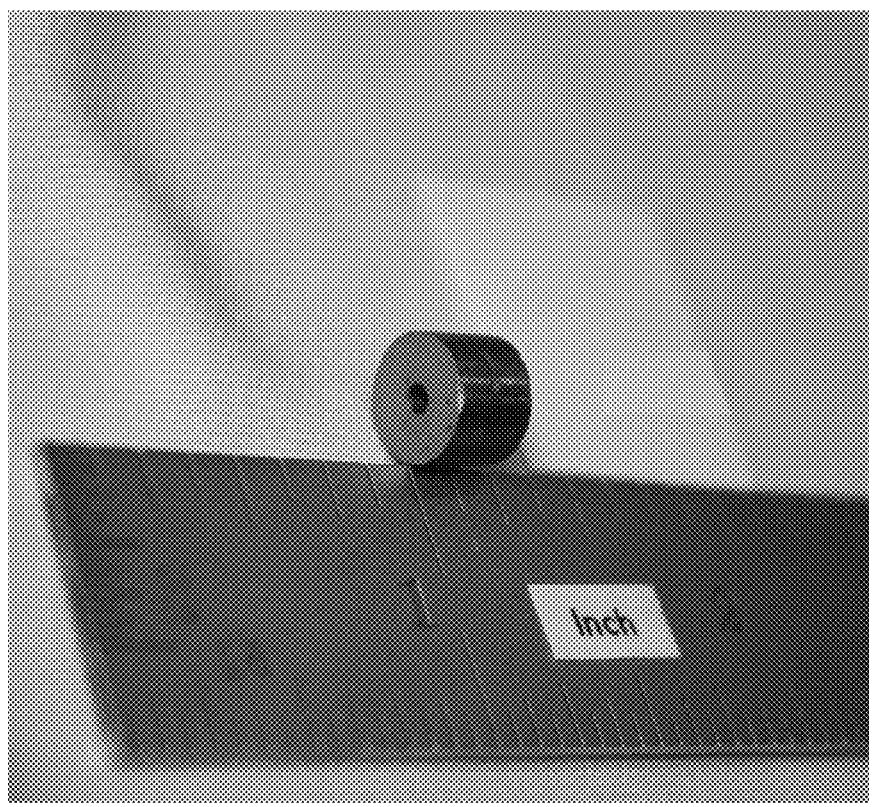
FIG. 10 is a photograph showing a perspective view of another machined $U_3Si_2$ structure, as described in Example 4.

In a second machining process, a sintered $U_3Si_2$ structure was subjected to a drilling process that included providing the sintered $U_3Si_2$ structure onto a support bar within a collet, a guide bushing was used to center a diamond-coated drill bit over a top surface of the sintered $U_3Si_2$ structure, and an opening exhibiting a diameter of about 1.6 mm (about 0.0630 in) was formed in a central portion of the sintered $U_3Si_2$ structure using the diamond-coated drill bill. FIG. 10 is a photograph showing a perspective view of the machined $U_3Si_2$ structure formed through the second machining process.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A method of forming an $U_3Si_2$ structure, comprising:
   forming a mixture comprising uranium particles and silicon particles;
   pressing the mixture to form a compact comprising the uranium particles and the silicon particles;
   subjecting the compact to an arc melting process to form a preliminary $U_3Si_2$ structure;
   subjecting the preliminary $U_3Si_2$ structure to a comminution process to form a fine $U_3Si_2$ powder;
   pressing the fine $U_3Si_2$ powder to form a green $U_3Si_2$ structure; and
   sintering the green $U_3Si_2$ structure.

2. The method of claim 1, wherein forming a mixture comprises:
   segmenting at least one larger uranium structure into smaller uranium structures;
   subjecting the smaller uranium structures to at least one hydriding/dehydriding process to form the uranium particles; and
   combining at least some of the uranium particles with the silicon particles to form the mixture, the mixture comprising from about 92.7 wt % uranium to about 92.5 wt % uranium and from about 7.3 wt % silicon to about 7.5 wt % silicon.

3. The method of claim 1, wherein pressing the mixture to form a compact comprises:
   providing at least a portion of the mixture into a cavity of a container; and applying a pressure within a range of from about 150 MPa to about 300 MPa to the at least a portion of the mixture within the cavity.

4. The method of claim 1, wherein subjecting the compact to an arc melting process comprises:
positioning the compact over a surface of a conductive structure;
positioning an electrode over the compact;
applying electric current to the electrode to form an arc between the electrode and the conductive structure and form a molten $U_3Si_2$ structure; and
cooling the molten $U_3Si_2$ structure to form the preliminary $U_3Si_2$ structure.

5. The method of claim 4, further comprising:
inverting the preliminary $U_3Si_2$ structure;
positioning the inverted preliminary $U_3Si_2$ structure over the surface of a conductive structure;
positioning an electrode over the inverted preliminary $U_3Si_2$ structure;
applying additional electrical current to the electrode over the inverted preliminary $U_3Si_2$ structure to form another arc between the electrode and the conductive structure over which the inverted preliminary $U_3Si_2$ structure is positioned and form another molten $U_3Si_2$ structure; and
cooling the another molten $U_3Si_2$ structure to reform the preliminary $U_3Si_2$ structure.

6. The method of claim 1, further comprising heating the compact to a temperature within a range of from about 800° C. to about 1450° C. prior to subjecting the compact to the arc melting process.

7. The method of claim 1, wherein subjecting the preliminary $U_3Si_2$ structure to a comminution process comprises:
subjecting the preliminary $U_3Si_2$ structure to an initial milling process to form an initial $U_3Si_2$ powder comprising $U_3Si_2$ particles each independently exhibiting a particle size less than or equal to about 5 mm; and
subjecting the initial $U_3Si_2$ particles to an additional milling process to form the fine $U_3Si_2$ powder, the fine $U_3Si_2$ powder comprising fine $U_3Si_2$ particles exhibiting an average particle size within a range of from about 0.5 μm to about 10 μm.

8. The method of claim 7, wherein subjecting the preliminary $U_3Si_2$ structure to an initial milling process to form an initial $U_3Si_2$ powder comprises hammer milling the preliminary $U_3Si_2$ structure.

9. The method of claim 7, wherein subjecting the initial $U_3Si_2$ particles to an additional milling process comprises:
subjecting the initial $U_3Si_2$ particles to a first planetary milling process to form smaller $U_3Si_2$ particles each independently exhibiting a particle size less than or equal to about 50 μm; and
subjecting the smaller $U_3Si_2$ particles to at least one second planetary milling process to form the fine $U_3Si_2$ particles.

10. The method of claim 9, wherein subjecting the initial $U_3Si_2$ particles to a first planetary milling process comprises:
introducing the initial $U_3Si_2$ particles and a first milling media into a milling container; and
pulverizing the initial $U_3Si_2$ particles using the first milling media and the milling container to form the smaller $U_3Si_2$ particles.

11. The method of claim 10, wherein subjecting the smaller $U_3Si_2$ particles to at least one second planetary milling process comprises:

separating the smaller $U_3Si_2$ particles from the first milling media;
providing the separated smaller $U_3Si_2$ particles and a second milling media into a milling container, the second milling media having an average particle size less than that of the first milling media; and
pulverizing the smaller $U_3Si_2$ particles using the second milling media and the milling container to form the fine $U_3Si_2$ particles.

12. The method of claim 11, further comprising:
selecting the first milling media to comprise hard material particles having an average particle size less than or equal to about 5 mm; and
selecting the second milling media to comprise additional hard material particles having an average particle size less than or equal to about 1 mm.

13. The method of claim 9, further comprising combining the initial $U_3Si_2$ particles with at least one lubricant prior to subjecting the initial $U_3Si_2$ particles to the first planetary milling process.

14. The method of claim 13, further comprising subjecting the fine $U_3Si_2$ particles to a volatilization process to substantially remove remaining portions of the at least one lubricant from the fine $U_3Si_2$ particles.

15. The method of claim 1, wherein pressing the fine $U_3Si_2$ powder comprises:
providing the fine $U_3Si_2$ powder into a die cavity; and
applying pressure to the fine $U_3Si_2$ powder within the die cavity to form the green $U_3Si_2$ structure, the green $U_3Si_2$ structure having a density within a range of from about 7.32 g/cm$^3$ to about 7.93 g/cm$^3$.

16. The method of claim 1, further comprising combining the fine $U_3Si_2$ powder with at least one binder material prior to pressing the fine $U_3Si_2$ powder to form the green $U_3Si_2$ structure.

17. The method of claim 1, wherein sintering the green $U_3Si_2$ structure comprises heating the green $U_3Si_2$ structure to a temperature within a range of from about 1200° C. to about 1500° C. under negative pressure or in an inert atmosphere for a sufficient amount of time to form a sintered $U_3Si_2$ structure having a density greater than or equal to about 11.47 g/cm$^3$.

18. The method of claim 17, further comprising subjecting at least one of the green $U_3Si_2$ structure or the sintered $U_3Si_2$ structure to at least one machining process to reduce at least one dimension thereof.

19. The method of claim 18, wherein subjecting at least one of the green $U_3Si_2$ structure or the sintered $U_3Si_2$ structure to at least one machining process comprises subjecting the sintered $U_3Si_2$ structure to a centerless grinding process.

20. A method of forming an $U_3Si_2$ structure, comprising:
forming a compact comprising from about 92.5 wt % to about 92.7 wt % uranium particles each independently exhibiting a particle size less than or equal to about 300 μm and from about 7.3 wt % to about 7.5 wt % silicon particles each independently exhibiting a particle size less than or equal to about 150 μm;
subjecting the compact to an arc melting process to form a preliminary $U_3Si_2$ structure;
subjecting the preliminary $U_3Si_2$ structure to a hammer milling process to form an initial $U_3Si_2$ powder comprising $U_3Si_2$ particles each independently having a particle size less than or equal to about 5 mm;
subjecting the initial $U_3Si_2$ powder to a planetary milling process to form a fine $U_3Si_2$ powder comprising fine $U_3Si_2$ particles exhibiting an average particle size less than or equal to about 4 μm;

combining the fine $U_3Si_2$ particles with at least one binder material to form a substantially homogeneous mixture;

pressing the substantially homogeneous mixture at a pressure within a range of from about 124 MPa to about 156 MPa to form a green $U_3Si_2$ structure exhibiting an aspect ratio less than or equal to about 1.0;

sintering the green $U_3Si_2$ structure at a temperature within a range of from about 1200° C. to about 1550° C. under at least one of vacuum or an inert atmosphere to form a sintered $U_3Si_2$ structure; and subjecting the sintered $U_3Si_2$ structure to a machining process to reduce at least one of a diameter of the sintered $U_3Si_2$ structure or a height of the sintered $U_3Si_2$ structure.

21. The method of claim 20, wherein subjecting the compact to an arc melting process comprises:

arc melting the compact within a conductive crucible to form a first molten $U_3Si_2$ structure;

cooling the first molten $U_3Si_2$ structure to form a first solid $U_3Si_2$ structure;

arc melting the first solid $U_3Si_2$ structure to form a second molten $U_3Si_2$ structure;

cooling the second molten $U_3Si_2$ structure to form a second solid $U_3Si_2$ structure exhibiting increased homogeneity relative to the first solid $U_3Si_2$ structure;

arc melting the second solid $U_3Si_2$ structure to form a third molten $U_3Si_2$ structure; and cooling the third molten $U_3Si_2$ structure to form the preliminary $U_3Si_2$ structure, the preliminary $U_3Si_2$ structure exhibiting increased homogeneity relative to the second solid $U_3Si_2$ structure.

22. The method of claim 20, wherein subjecting the initial $U_3Si_2$ powder to a planetary milling process comprises:

combining the initial $U_3Si_2$ powder with a milling aid comprising at least one of oleic acid or polyethylene glycol to form a first mixture;

grinding the first mixture using a milling media comprising partially stabilized zirconia particles having an average particle size less than or equal to about 5 mm to form a second mixture comprising the milling aid and smaller $U_3Si_2$ particles each independently exhibiting an average particle size less than or equal to about 50 μm;

grinding the second mixture using another milling media comprising additional partially stabilized zirconia particles having an average particle size less than or equal to about 1 mm to form a third mixture comprising the milling aid and the fine $U_3Si_2$ particles; and heating the third mixture above a decomposition temperature of the milling aid to substantially remove the milling aid from the fine $U_3Si_2$ particles.

23. The method of claim 20, wherein combining the fine $U_3Si_2$ particles with at least one binder material comprises combining the fine $U_3Si_2$ particles with poly(ethylene oxide) having a molecular weight greater than or equal to about 4,000,000 g/mol.

24. The method of claim 20, wherein subjecting the sintered $U_3Si_2$ structure to a machining process comprises centerlessly grinding the sintered $U_3Si_2$ structure to reduce the diameter and the height of the sintered $U_3Si_2$ structure.

* * * * *

UNITED STATES PATENT AND TRADEMARK OFFICE
CERTIFICATE OF CORRECTION

PATENT NO. : 10,109,381 B2
APPLICATION NO. : 14/746279
DATED : October 23, 2018
INVENTOR(S) : Jason Michael Harp, Paul Alan Lessing and Rita Elaine Hoggan It is certified that error appears in the above-identified patent and that said Letters Patent is hereby corrected as shown below:

In the Specification

Column 9, Line 20, change "850 micrometers (nm)."
to --850 micrometers (μm)--

Column 18, Line 66, change "a 39 nm sieve," to --a 39 μm sieve,--

Signed and Sealed this
Fourth Day of December, 2018

Andrei Iancu
*Director of the United States Patent and Trademark Office*